United States Patent [19]

Pruett

[11] 4,267,746
[45] May 19, 1981

[54] SINGLE HAND-OPERATED DUAL BRAKE ACTUATOR

[76] Inventor: Earl M. Pruett, 4725 Vienna, St. Louis, Mo. 63109

[21] Appl. No.: 35,737

[22] Filed: May 3, 1979

[51] Int. Cl.³ ............................ G05G 9/00; B62L 3/02
[52] U.S. Cl. .................................. 74/489; 74/471 R; 188/2 D
[58] Field of Search ...................... 74/471 R, 488, 489; 188/2 D, 24

[56] References Cited

U.S. PATENT DOCUMENTS

| 3,258,298 | 6/1966 | Holland | 74/471 X |
| 3,960,030 | 6/1976 | Williams | 74/489 X |
| 4,057,127 | 11/1977 | Woodring | 188/24 |
| 4,134,481 | 1/1979 | Calderazzo | 188/24 X |

FOREIGN PATENT DOCUMENTS

| 666334 | 5/1929 | France | 74/489 |
| 435281 | 5/1948 | Italy | 188/24 |
| 447581 | 4/1949 | Italy | 188/24 |
| 523976 | 11/1954 | Italy | 74/489 |
| 132783 | 10/1920 | United Kingdom | 74/489 |

*Primary Examiner*—Allan D. Herrmann
*Attorney, Agent, or Firm*—Lionel L. Lucchesi

[57] ABSTRACT

A single hand-operated actuator for effecting operation of two devices, such as the front and rear caliper brakes of a bicycle or the like. The actuator includes a base adapted to be secured to the handle bars of a bicycle and having two Bowden sliding wire or cable linkages thereon with the linkages being interconnected to a lever operated by one hand for effecting actuation of both the front and rear brakes of the bicycle via the linkages. In another version of the actuator of this invention, a mechanical power assist is provided for aiding operation of the actuator.

8 Claims, 9 Drawing Figures

SINGLE HAND-OPERATED DUAL BRAKE ACTUATOR

BACKGROUND OF THE INVENTION

This invention relates to a hand-operated actuator for bicycle caliper-type brakes or the like, and more particularly relates to such an actuator which may be operated by one hand and which effects braking action on both the front and rear caliper brakes of a bicycle or the like.

Hand actuated brakes for bicycles are, of course, well known. Typically, such braking systems include a caliper mounted on the frame of a bicycle and having brake pads movable toward one another for gripping the rim of a bicycle wheel for applying braking force on the wheel. The caliper is typically actuated by a respective pivoted handle mounted on the handle bars of the bicycle with the brake handle being interconnected to the caliper via a Bowden sliding cable linkage or the like. A spring on the caliper biases the pads towards a released position in which they are clear of their respective wheel rim. Typically, a bicycle is provided with two such brake actuating handles, one for the front wheel caliper and one for the rear wheel caliper.

With prior hand actuated caliper-type brakes, several problems have heretofore been encountered. For example, if the front brake is applied first or if it is applied too hard, the front wheel may tend to lock up and to thus cause the rider to fall. If, on the other hand, the back brake is applied too hard, the rear of the bicycle may tend to slide. Also, the provision of two brake handles requires the rider to have both his hands free to operate the brakes, requires timing between application of the brake handles, and also requires the rider to proportionally apply braking forces on the front and rear wheels. This is sometimes difficult to do when carrying packages or shifting gear speeds on the bicycle.

References may be made to such U.S. Pat. Nos. as 2,829,534 and 3,861,234 which disclose various brake levers for bicycles in the same general field as the present invention.

Among the several objects and features of this invention may be noted the provision of a hand-actuated mechanism for caliper-type bicycle brakes or the like in which only one hand is required to actuate the brakes on both the front and rear wheels of the bicycle;

The provision of such an actuating mechanism which decreases the possibility of locking up either the front or rear wheel of the bicycle upon application of the brakes;

The provision of such an actuating mechanism in which the front and rear braking action of the bicycle is applied in a predetermined proportional relation;

The provision of such an actuating mechaninsm which can be readily installed on the handle bars of a bicycle for operation of the brakes by either the right or left hand of the rider;

The provision of such an actuating mechanism in which either the front or rear wheel of the bicycle may be selected to apply the majority of the stopping of the bicycle;

The provision of such an actuating mechanism which includes power assist means for aiding the rider in application of the brakes thereby to decrease the force required to actuate the brakes; and The provision of such an actuating mechanism which may be readily and economically fabricated, which is rugged construction, which is reliable in operation, and which may be readily adapted for use in many different applications.

Other objects and features of this invention will be in part apparent and in part pointed out hereinafter.

SUMMARY OF THE INVENTION

Briefly, a single handed brake actuator of this invention is intended for use with caliper-type bicycle brakes or the like. The actuator comprises a base adapted to be secured, for example, to the handle bars of a bicycle. A first reaction point is provided on the base for receiving and holding the outer tube of a first Bowden sliding member linkage. A second reaction point is also provided on the base for receiving and holding the outer tube of a second Bowden sliding member linkage. A handle is pivotally mounted on the base and the handle has means for attachment of the movable cables of the first and second Bowden linkages thereto. The handle is manually movable between a released position and an actuated position for effecting relative sliding movement between the sliding members and tubes of the first and second Bowden sliding cable linkages for effecting actuation of the bicycle brakes.

BRIEF DESCRIPTION OF THE DRAWINGS

FIG. 7 (sheet 2) is a view similar to FIG. 4 illustrating a variation of the actuator of the present invention such as may be conveniently utilized with three speed touring bicycles or the like;

Corresponding reference characters indicate corresponding parts throughout the several views of the drawings.

DESCRIPTION OF PREFERRED EMBODIMENTS

Figure 2:
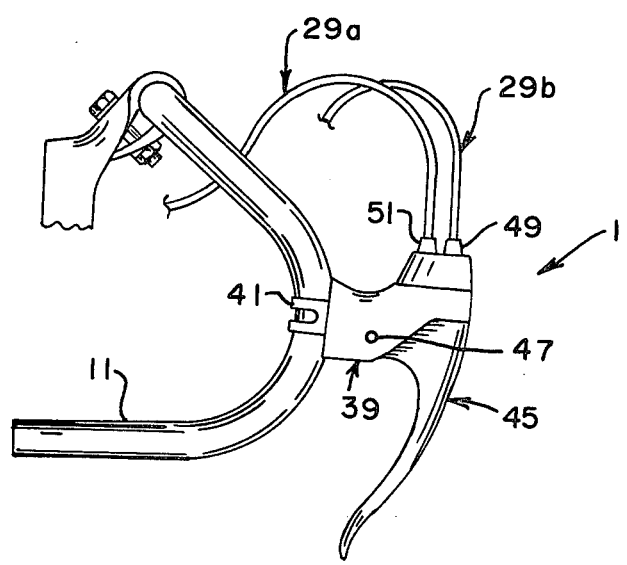
FIG. 2 is an enlarged side elevational view of the handle bars of the bicycle illustrating the single hand-operated actuator of the present invention.

Referring now to the drawings, a single hand-operated brake actuator of this invention is indicated in its entirety at 1 and is shown to be mounted on a bicycle, as generally indicated at 3. The bicycle is shown to have a front wheel 5, a rear wheel 7, a frame 9, and a handle bar assembly 11. Each wheel includes a rim 13 having a pair of spaced sides 15a, 15b facing outwardly thereof with a tire 16 mounted on the rim in conventional fashion. Front and rear caliper assemblies, as indicated in their entirety at 17 and 19, respectively, are mounted on the bicycle for application of braking force to their respective wheels. These caliper brake assemblies are essentially identical and therefore only the rear assembly 19 will be described in detail.

Figure 3:
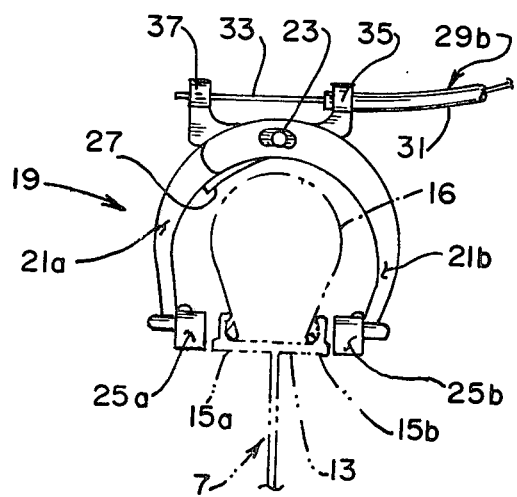
FIG. 3 (sheet 2) is an enlarged view taken along line 3—3 of FIG. 1 illustrating a caliper-type brake assembly for a bicycle with the bicycle wheel, wheel rim, and tire being shown in phantom.

Referring now to FIG. 3 (see sheet 2), rear brake caliper assembly 19 is shown to include a pair of opposed brake jaws 21a, 21b pivotally mounted on a bolt 23 which in turn is secured to bicycle frame 9. Each jaw 21a, 21b carries a respective brake pad 25a, 25b, for frictional engagement with a respective surface 15a, 15b of wheel rim 13 for application of braking force thereon. Jaws 21a, 21b are simultaneously moved from a retracted position (as shown in FIG. 3) in which the pads are clear of the wheel rim toward a braking position in which the pads brakingly engage rim surfaces 15a, 15b. A spring 27 interposed between the jaws biases the jaws outwardly toward their retracted position. As generally incidated at 29a (for front brake 17) and at 29b (for rear brake 19), a so-called Bowden sliding member linkage is provided for interconnecting actuator 1 of the present invention and the caliper brake assemblies so as to effect movement of jaws 21a, 21b from their retracted positions to their braking positions in response to actuation of actuator 1. Each Bowden linkage includes an outer tube or sheath 31 and an inner movable member 33 (e.g., a sliding wire or cable). In FIG. 3, outer tube 31 of Bowden linkage 29a is shown to be anchored to jaw 21b in a cradle 35 and cable 33 is shown to be anchored to jaw 21a, as indicated at 37. Thus, upon the forceable retraction of cable 33 into tube 31, the jaws are forced to close and to move toward their braking position.

Figure 4:
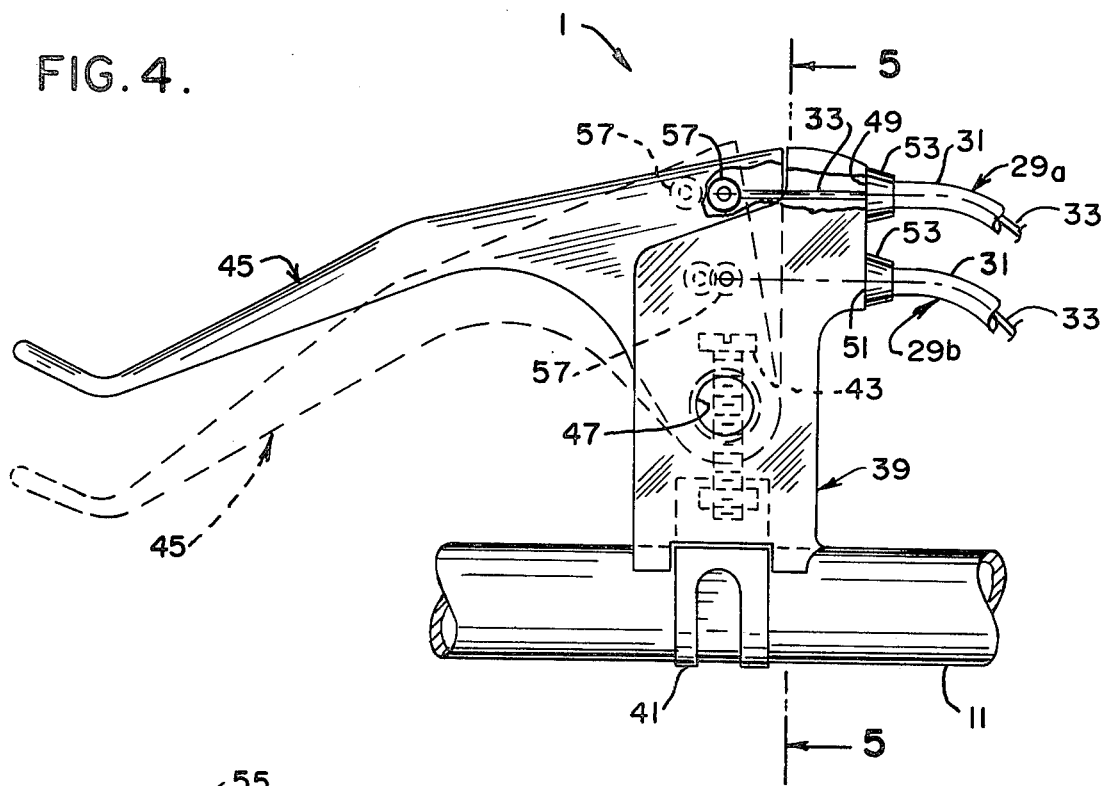
FIG. 4 (sheet 3) is an enlarged view of the actuator with the handle of the actuator being illustrated in solid lines in its released position and being illustrated in dotted lines in its actuated position with parts broken away for clarity.
Figure 5:
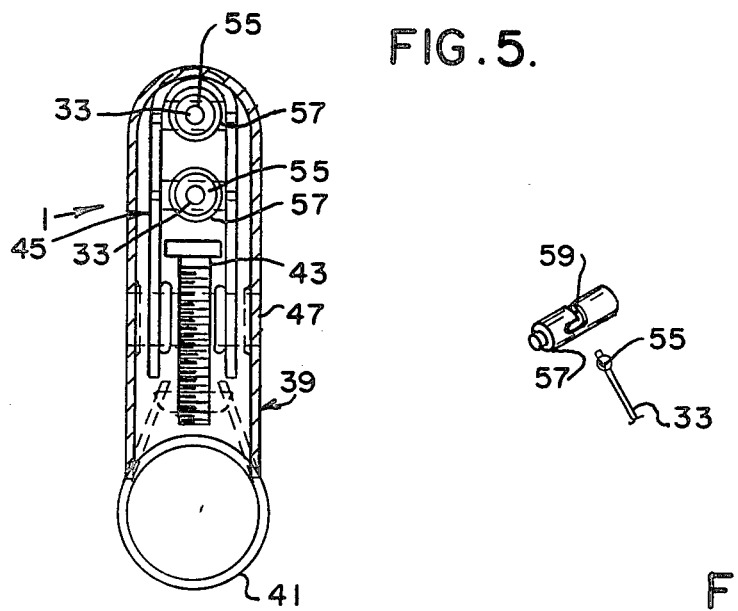
FIG. 5 is a cross sectional view taken along line 5—5 of FIG. 4.

In FIG. 4, actuator 1 of this invention is shown to comprise a base 39 which is adapted to be firmly secured or clamped in a desired position on handle bar 11 so as to be in a location as may be preferred for manual actuation by the rider of the bicycle. A clamp 41 is provided on the base which fits around handle bar 11. A tightening screw 43 is provided within the base for selectively tightening or loosening clamp 41 and actuator 1 on the handle bars. It will be appreciated that within the scope of this invention, actuator 1 may be selectively mounted in any location on the handle bars and may be located for actuation either by the right or left hand of the rider, as the latter may prefer. The actuator further includes a handle or lever 45 pivotally hinged to base 39 by means of a hinge pin 47 for pivotal or swinging movement relative to the base from a retracted position (as shown in solid lines in FIG. 4) toward handle bar 11 to a brake applying position (as shown in dotted lines in FIG. 4) for effecting movement of caliper jaws 21a, 21b of both the front and rear brake assemblies 17 and 19 from their retracted toward their brake applying positions upon the rider squeezing with one hand so as to effect movement of lever 45.

Base 39 includes a first attachment or reaction point 49 for securement of the first Bowden linkage 29a to the base and a second attachment or reaction point 51 for securement of the outer tube of the second Bowden linkage. These attachment points each include a suitable grommet 53 mounted on base 39 for reception and securement of their respective outer tubes 31 to the base.

Figure 6:
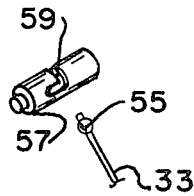
FIG. 6 is an exploded perspective view of a barrel member which is installed within the handle of the actuator for receiving and holding a movable cable of a respective Bowden sliding cable linkage arrangement.

As shown in FIG. 4, sliding cables or wires 33 of Bowden tube linkages 29a and 29b extend from their respective grommets 53 for attachment to handle 45. As best shown in FIG. 6, each cable 33 has a ball 55 or other enlarged member securely fastened (e.g., swaged or crimped in place on the cable) adjacent its free ends. A pair of barrel members 57 is carried by handle 45 and each barrel has a slot 59 therein for receiving a respective cable 33 and ball 55 so as to fix the cable to the barrel member. It will be appreciated that the barrel members are free to rotate within handle 45 about their longitudinal axes thereby to permit the cable to be stretched taut between their respective reaction points 49 and 51 on base member 39 as the angular position of the barrel member changes with respect to these attachment points during pivoting movement of the handle between its retracted and brake applying positions. This in turn prevents kinking of the cables and contributes to a long service life of the brake actuator assembly. With the cables so attached to handle 45, it will be appreciated that as the handle is moved from its retracted to its brake applying position, the cables 33 of both Bowden linkages 29a and 29b are forceably drawn out of their respective outer tubes 31 and thus, at their respective caliper brake assemblies 17 and 19, the cables are also forceably moved with respect to the outer tubes thereby to close of caliper jaws 21a and 21b so as to effect application of both sets of caliper brakes.

In accordance with this invention, attachment points 49 and 51 on base 39 are spaced apart so that point 49 is spaced radially outwardly from point 51 with respect to hinge pin 47. Likewise, the barrel member 57 for receiving the cable of the first Bowden linkage 29a is spaced apart from the barrel receiving the cable of the second linkage 29b. Thus, upon application of the brakes (i.e., upon movement of handle 45 from its retracted to its brake applying position), cable 33 of linkage 29 is moved through a greater distance than cable 33 of the second Bowden linkage 29b. Thus, greater force may be applied to one of the brake calipers at all times upon actuation of actuator 1. Also, by selectively providing a desired amounts of slack in the Bowden cable linkages, the braking force applied to the front or rear wheel may be selectively adjusted to be in any desired proportional relationship. That is, the amount of braking force may be applied to the front or rear wheel varied as desired or, with the certain adjustments of the Bowden cable linkages, the braking force applied to both wheels can be adjusted to approximately equal. Also, by interchanging the positions of the Bowden linkages on base 39, the majority of the braking force can be applied to either the front or rear wheel of the bicycle, as may be desired by the rider. Thus, the braking characteristics of the bicycle may be readily adjusted to suit the desires of the rider and yet both brakes may be applied by one hand operation of actuator 1 of the present invention.

Figure 1:
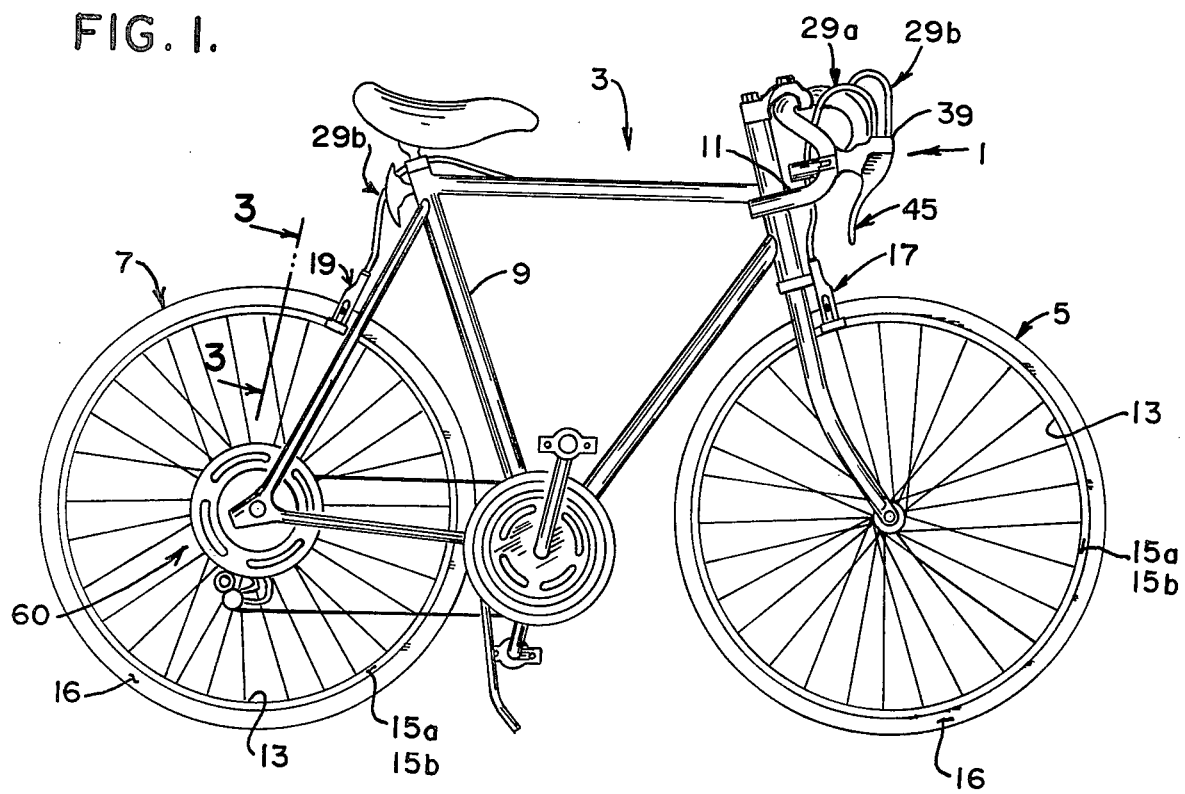
FIG. 1 is a side elevational view of a bicycle having front and rear caliper-type brakes and further having a single hand-operated actuator of the present invention for effecting operation of the front and rear brakes.
Figure 7:
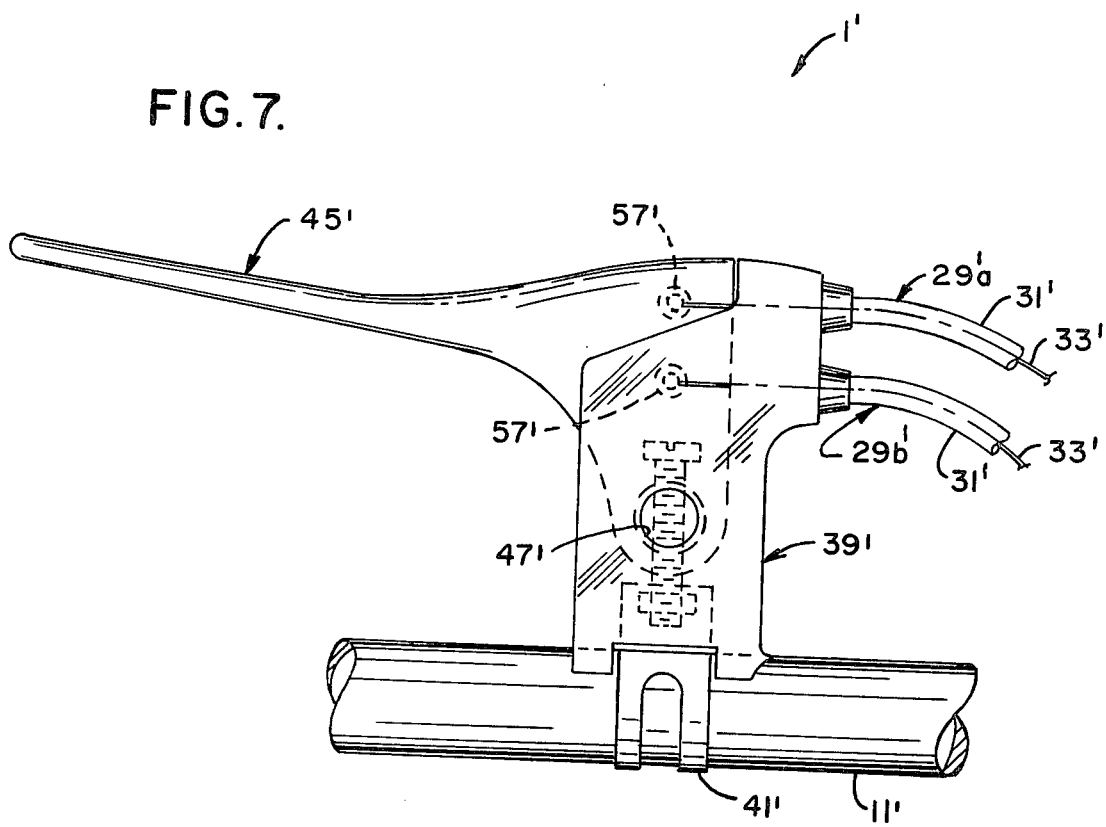

Bicycle 3 shown in FIG. 1 is a conventionl 10 speed touring bicycle having a Deraillier speed changer 60 and having the touring handle bars 11 as shown. Handle 45 of actuator 1 (as shown in FIGS. 1-4) is particularly configured for ease of operation when installed on bicycles as shown in FIG. 1. In FIG. 7, an actuator 1' is shown which is generally similar to actuator 1 heretofore described but for the shape of handle 45'. This handle is particularly configured for ease of operation when actuator 1' is installed on handle bar 11' of, for example, a three speed touring bicycle or the like.

Figure 9:
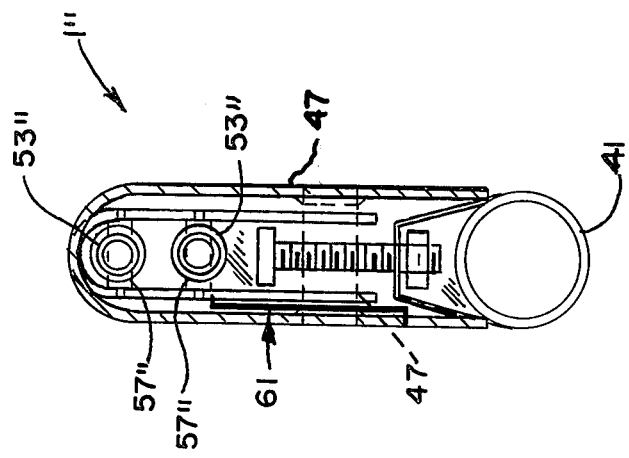
FIG. 9 is a cross sectional view of the actuator shown in FIG. 8 taken along line 9—9 of FIG. 8.
Figure 8:
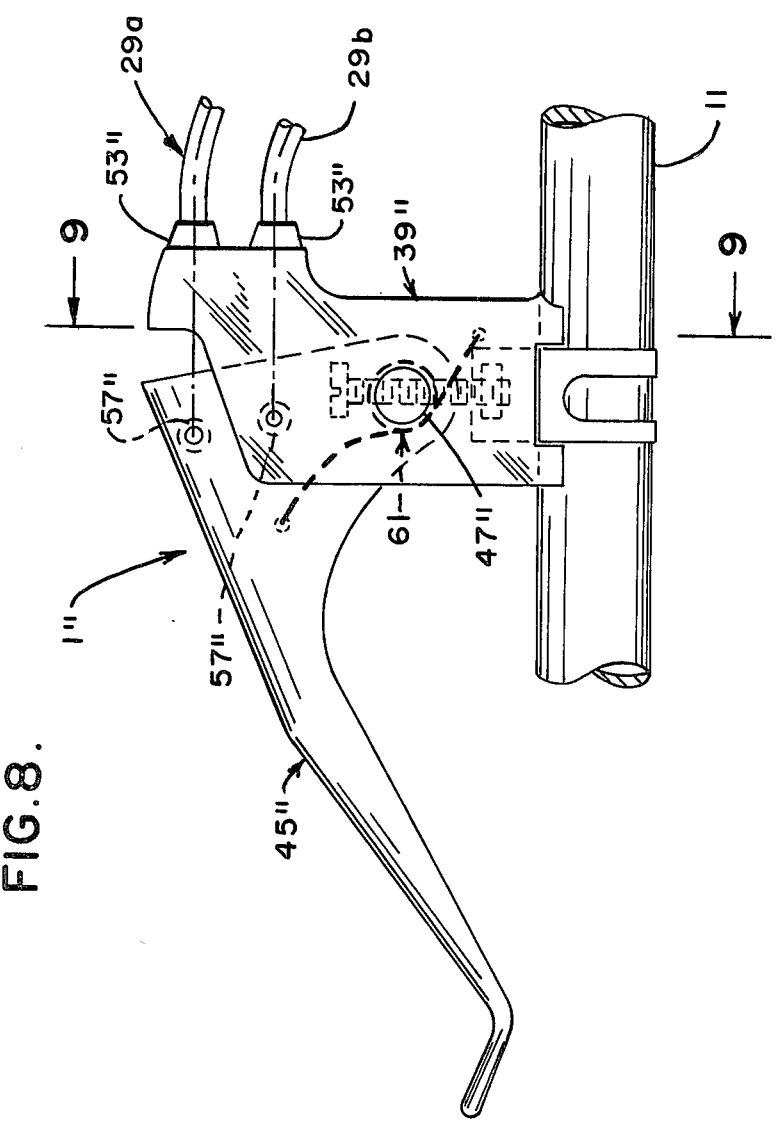
FIG. 8 (sheet 4) is an enlarged view of another embodiment of an actuator of the present invention having a spring incorporated therein for aiding the rider in application of the brakes of the bicycle.

Referring now to FIGS. 8 and 9, another embodiment of the present invention, as indicated in its entirety at 1″ is illustrated. In general, actuator 1″ is essentially identical to actuator 1 heretofore described but for the provision of a mechanical spring as indicated at 61, interposed between handle 45″ and base 39″ for applying a force on handle 45″ which aids the rider in actuation of actuator 1″ upon initially moving the handle from its released position toward its brake applying position. Thus, spring 61 constitutes power assist means for reducing the force which the rider must apply to the brake handle to effect actuation of the brakes. As shown, spring 61 is a leaf type spring connected at its ends to base 39″ and to handle 45″ and engageable with hinge pins 47″. However, within the broader aspects of this invention, may be a torsion spring, a coil spring, a hairpin spring, or any other type spring. It will be understood that springs 27 in brake caliper assemblies 17 and 19 have sufficient force so as to return their respective calipers 21a″, 21b″ to their fully retracted positions against the bias of spring 61.

It will be further understood that within the broader aspects of this invention, the actuators herein described may, of course, be used to actuate means other than caliper brakes on bicycles. For example, in certain types of power tools or machines, the actuator of this invention may be used for the simultaneous engagement or disengagement of clutches or other mechanical devices. It will also be appreciated that when installed on a bicycle, the Bowden linkages 29a and 29b may be of sufficient length as to permit the handle to be switched from the right to the left handle bar as may be desired by the rider.

In view of the above, it will be seen that the several objects and features of this invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A single hand-operated actuator for a pair of caliper-type bicycle brakes or the like, each of said brakes being actuated by a respective Bowden sliding element linkage, each of said Bowden sliding element linkages including an outer sheath and an inner sliding member, said actuator comprising a base adapted to be secured to the handle bars of a bicycle, a first reaction point on the base for receiving and holding the outer sheath of a first of said Bowden sliding element linkages, a second reaction point on the base for receiving and holding the outer sheath of a second of said Bowden sliding element linkages, a handle pivotally mounted on said base, said handle having separate means for securing said inner sliding members of each of said first and second Bowden sliding member linkages to the handle, said handle being manually movable between a released position in which said inner sliding members are spaced relatively close to said reaction points and an actuated position for effecting substantially simultaneous, proportional, relative sliding movement between said inner sliding members and their respective outer sheaths of said first and second Bowden sliding element linkages thereby to apply said pair of brakes substantially simultaneously with a preselected proportion of braking force applied by each of said brakes.

2. An actuator as set forth in claim 1 wherein said handle is pivotally mounted on said base at a pivot point, and wherein said first reaction point is spaced radially outwardly from said second reaction point with respect to said pivot point, and wherein the inner sliding member of said first Bowden sliding member linkage is attached to said handle at a point spaced radially outwardly from said inner sliding member of said second Bowden sliding element linkage relative to said pivot point.

3. An actuator as set forth in claim 1 further comprising means for reducing the force a user of said actuator must apply to said handle for actuating said brakes.

4. In a hand operated actuator for caliper-type brakes on a bicycle or the like, said caliper-type brakes including two pairs of caliper brake assemblies, one for the front wheel and one for the rear wheel of the bicycle, each of said caliper brake assemblies including a pair of opposed brake jaws movable toward and away from one another for application and release of braking force to a respective wheel rim of said bicycle, each of said caliper brake assemblies having a Bowden sliding element linkage for effecting movement of said brake jaws upon operation of said actuator and a spring for biasing said brake jaws toward a released position, each of said Bowden sliding element linkages including an outer sheath and an inner sliding member within the sheath, wherein the improvement comprises: a hand-operated actuator assembly adapted to be mounted on the handle bars of said bicycle and adapted to be operated by one hand of the rider so as to effect application of both of said caliper brake assemblies, said actuator assembly comprising a base adapted to be secured to the handle bars, a handle lever hinged on said base and pivotally movable relative to the base toward said handle bars from a released position to a brake applying position upon the rider actuating said actuator for application of aid brakes, said base including a first reaction point for receiving and holding secure the outer sheath of one of said Bowden linkages and a second reaction point for receiving and holding secure the outer sheath of the other of said Bowden linkages, the sliding elements of said first and second Bowden linkages being secured to said lever at separate points space radially outwardly from the hinge point of said lever and being movable with said lever as the latter pivots from its released to its actuating position thereby to effect the substantially simultaneous application of both of said brake assemblies with a preselected proportion of braking force applied by each of said brakes.

5. In a hand-operated actuator assembly as set forth in claim 4 wherein said first sliding element is positioned radially outwardly from said second sliding element on said lever with respect to the hinge connection between said lever and said base.

6. In a hand-operated actuator assembly as set forth in claim 5 wherein said outer sheath of said first Bowden linkage is positioned radially outwardly from said outer sheath of said second Bowden linkage with respect to said hinge connection between said lever and said base.

7. In a hand operated actuator for a caliper-type bicycle brake or the like, said actuator being operatively connected to the brake via a Bowden sliding element linkage, said actuator having a base and a lever pivotally mounted relative to the base for movement between a brake release position and a brake applying position, wherein the improvement comprises: means interposed between said handle and said base portion of said actuator for application of a force on the handle so as to aid in moving said handle from its brake release position toward its brake applying position upon manual movement of the handle toward its brake applying position thereby to facilitate application of said brake.

8. In an actuator as set forth in claim 7 wherein said force application means comprises a resilient spring interposed between said handle and said base portion.

* * * * *